United States Patent Office 3,835,030
Patented Sept. 10, 1974

3,835,030
CRYSTALLINE ALUMINO-SILICATE CATALYSTS FOR CATALYTIC CRACKING
William Judson Mattox and William Floyd Arey, Jr., Baton Rouge, La., assignors to Esso Research and Engineering Company
No Drawing. Continuation of application Ser. No. 469,895, July 6, 1965, which is a continuation-in-part of application Ser. No. 168,548, Jan. 24, 1962, both now abandoned. This application Oct. 16, 1972, Ser. No. 297,761
Int. Cl. B01j 9/20; C01b 33/28; C10g 11/18
U.S. Cl. 208—120        18 Claims

ABSTRACT OF THE DISCLOSURE

Hydrocarbon oils are catalytically cracked with a catalyst comprising a crystalline alumino-silicate which has been base exchanged with both (1) hydogen ions and/or ions capable of conversion to hydrogen ions, and (2) cations of metals selected from Group IB through Group VIII of the Periodic Table.

RELATED APPLICATIONS

This application is a continuation of Ser. No. 469,895 filed July 6, 1965 which was a continuation-in-part of Ser. No. 168,548 by William F. Arey, Jr. and William J. Mattox, filed Jan. 24, 1962, both now abandoned.

BACKGROUND OF THE INVENTION

The present invention relates to the catalytic cracking of hydrocarbons. It is more particularly concerned with a process wherein hydrocarbons are subjected to catalytic cracking in the presence of a large pore crystalline zeolite having uniform pore openings between 6 and 15 Angstrom units and having a silica to alumina mole ratio of at least 3, and usually between 4 and 7. Still more particularly, the present invention is concerned with an improved catalytic cracking process employing a catalyst comprising a crystalline zeolite having pore openings large enough to adsorb aromatic and branched chain hydrocarbons and having a silica to alumina ratio greater than 3, preferably between 4 and 6 and especially 5 to 6.

Cracking of hydrocarbons in the presence of a silica-alumina and silica-magnesia containing catalyst is a well-known refinery operation. For example, it is well known to treat petroleum oils boiling in the range above about 400° F. with these catalysts at a temperature in the range of about 600° to 1100° F. to obtain petroleum oil fractions boiling in the motor fuel boiling range. It is also known that synthetic porous solids, comprising silica and one or more metallic oxides, such as alumina, magnesia, zirconia, beryllia, borea and others, have catalytic properties for the treatment of petroleum oils.

The cracking process itself consists in passing the feed stock over the catalyst, if a fixed bed of catalyst is used, or in contact with a moving bed or a fluidized solids bed of catalyst at suitable temperature, pressure, feed rates, etc., to effect a substantial conversion of the feed stock to lower boiling materials, such as gasoline; the process is generally carried out in the absence of added hydrogen and of a hydrogenation component, thus distinguishing it from hydrocracking.

The prior art catalysts that have been employed in this process, and they are legion, have not been completely satisfactory for a number of reasons. The most commonly employed, and indeed standard, catalyst is one containing about 13% alumina and 87% silica. More recently, one containing about 25% alumina has been used. These catalysts are generally prepared from silica hydrogel or hydrosol, then mixed with alumina to secure the desired silica-alumina composition; if desired, oxides of metals, such as magnesium, chromium, Groups II, III, IV, VI and VIII, are added. By whatever means prepared, the final catalyst is amorphous, and their drawback stems inherently from its amorphous nature. The amorphous gels have pore openings of varying sizes ranging from less than about 5 Angstroms diameter to as much as 200 Angstroms diameter and higher. In the very fine pores, a feed molecule encounters diffusion difficulties, with the net result that the feed molecules do not have free access over all the surface, and the product molecules may not evaporate from the pore before being converted to a high boiling hydrogen-deficient coke deposit. The latter may cover up some of the active catalytic agent and also require more frequent regeneration of the catalyst by burning the coke off with air. All these features tend to shorten catalyst life.

A significant step forward was taken when it was discovered that certain metallic alumino-silicates had catalytic cracking properties. These catalysts, described in U.S. Pat. No. 2,971,903, show high activity and selectivity while comprising a highly ordered crystalline materials characterized by having pores of nearly uniform dimension in the range of about 6 to 15 angstroms. This catalyst comprises an alumino-silica anionic cage structure in which the alumina and silica tetrahedra are intimately connected to each other. Metal cations are distributed throughout the structure to maintain electrical neutrality. The dispersion of the silica and alumina tetrahedra is highly ordered, thereby making for a maximum number of active sites. The uniform pore openings in the range of about 6 to 15 angstrom units allow for easy ingress of substantially all hydrocarbon feed types and egress of the reaction products. This serves to lower catalytic coke buildup within the structure and improve regeneration characteristics of the catalyst.

Normally these large pore zeolites, "Type 13" molecular sieves, are prepared by having present in the reaction mixture $Al_2O_3$ as sodium aluminate, alumina sol and the like; $SiO_2$ as sodium silicate and/or silica gel and/or silica sol; and an alkaline hydroxide, either free and/or in combination with the above components. Careful control should be kept over the pH, and sodium ion concentration of the mix and the crystallization period, all in a manner known per se. The zeolite has a nominal anhydrous composition, as prepared, of $Na_2O \cdot Al_2O_3 \cdot XSiO_2$ where the relative silica content may vary. Crystalline alumino-silicates characterized by pore openings of 6 to 15 angstroms can be prepared having a range of $SiO_2/Al_2O_3$ mole ratios of from about 2.2/1 to about 6/1 and higher. These materials are similar in their (1) adsorptive properties, (2) surface areas and pore volumes, (3) X-ray diffraction patterns and (4) pore openings. For example, the zeolite designated by the Linde Co. as 13X comprises nominally a $SiO_2/Al_2O_3$ mole ratio of about 2.7 (U.S. 2,882,244). On other hand, the natural sieve mineral faujasite has the same structure and physical properties as the 13X material but has an $SiO_2/Al_2O_3$ mole ratio of about 5/1. An intermediate zeolite of a 3.5/1 mole ratio can be prepared by treatment of a permutitic acid with sodium silicate.

It has surprisingly been found that though the physical and electrical properties of these zeolites are independent of the silica/alumina ratios, some of the catalytic properties are markedly affected thereby. Thus, though even the low silica/alumina ratio zeolites have good catalytic properties, these are markedly enhanced when this ratio is increased above 3.

This beneficial effect of increased silica/alumina ratio is quite unexpected in view of the effect of $SiO_2/Al_2O_3$ ratio in present day commercial silica-alumina catalysts on cracking activity, where, within the same range of composition, activity has been found to increase as the $SiO_2/Al_2O_3$ ratio decreass. This effect is illustrated by the data in the following table.

Effect of $SiO_2/Al_2O_3$ Ratio on Activity in Commercial Silica-Alumina Catalysts Feed: Light gas oil; Temp.: 950° F.; v./v./hr.: 2.0; process Pd: ½ hr. (catalysts steamed 24 hrs. at 1,050° F. and 60 p.s.i.g.)

| $SiO_2/Al_2O_3$, mole ratio | 2.5 | 3.0 | 4.2 | 5.1 |
|---|---|---|---|---|
| Wt. percent $Al_2O_3$ | 40 | 36 | 30 | 25 |
| Percent conversion to 430° F. and lighter | 47 | 46 | 43 | 40 |

In these commercial type silica-alumina catalysts, increasing the $SiO_2/Al_2O_3$ ratio from 2.5 to 4.2 resulted in a decrease in conversion from 47 to 43%. A further drop in conversion to 40% was obtained with a 5.1/1 ratio catalyst.

It is the high silica/alumina ratio crystalline zeolites of pore openings of 6 to 15 Angstrom units, sometimes referred to as "Y" sieves, suitably base exchanged with certain metallic cations, such as alkaline earth metal cations or mixtures of metallic cations with hydrogen ions, or ions capable of conversion to hydrogen ions, that is the cracking catalyst employed in accordance with the present invention.

A general scheme for preparing the cracking catalyst employed in the present invention is as follows:

Colloidal silica, such as the commercial Ludox brand, is mixed with a solution of sodium hydroxide and sodium aluminate and heated to about 200° to 215° F. to effect crystallization. The sodium alumino-silicate is filtered, washed and then cationic exchanged with a solution of a metal salt, such as an alkaline earth salt, or with a solution containing at least one metallic cation (e.g. alkaline earth metal cation) and a hydrogen ion. The hydrogen ions can be supplied by inorganic or organic acids; the metal cations can be supplied by metallic salts; and ammonium compounds can supply the cations capable of conversion to hydrogen ions.

In addition to the discovery of the unexpected effect of $SiO_2/Al_2O_3$ ratio on the properties of crystalline aluminosilicate zeolites, it has also been found that crystalline zeolites which have been ion-exchanged with both a metal cation and a hydrogen ion or an ion capable of conversion to a hydrogen ion are highly active catalytic cracking catalysts. More particularly, the crystalline aluminosilicates in this embodiment of the invention contain about 0.5 to about 1.0, preferably between about 0.8 and 1.0, more preferably more than 0.9, and most preferably about 1.0 equivalent, of ions of positive valence per gram atom of aluminum. These ions of positive valence consist of 0.01 to 0.99 equivalent of hydrogen ion per gram atom of aluminum and from 0.99 to 0.01 equivalent per gram atom of aluminum of cations of metals selected from Groups I-B through VIII of the Periodic Table. Preferred metal cations include the alkaline earth metal cations and, particularly, magnesium cations. Except for alkali metal cations, e.g. sodium, which may be present as impurities to the extent of less than 0.25 equivalent per gram atom of aluminum, no other cations of metals of Group I-A of the Periodic Table will be associated with the aluminosilicate.

In preparing the catalyst composition, the aluminosilicate can be contacted with a non-aqueous or aqueous fluid medium comprising a gas, polar solvent or water solution containing the desired hydrogen ion or ammonium ion capable of conversion to a hydrogen ion and at least one metallic salt soluble in the fluid medium. Alternatively, the alumino-silicate can be first contacted with a fluid medium containing a hydrogen ion or ammonium ion capable of conversion to a hydrogen ion and then with a fluid medium containing at least one metallic salt. Similarly, the alumino-silicate can be first contacted with a fluid medium containing at least one metallic salt and then with a fluid medium containing a hydrogen ion or an ion capable of conversion to a hydrogen ion or a mixture of both. Water is the preferred medium for reasons of economy and ease of preparation in large scale operations involving continuous or batchwise treatment.

A variety of acidic compounds can be employed as a source of hydrogen ions and include inorganic acids, such as hydrochloric, sulfuric, etc., and organic acids, such as carboxylic acids. As a source of ions capable of conversion to hydrogen ions, ammonium compounds can be employed which decompose to provide hydrogen ions when the alumino-silicate zeolite is first treated with an ammonium compound solution and then subjected to elevated temperature below the zeolite decomposition temperature. Typical ammonium compounds include, for example, ammonium chloride, carbonate, sulfate, acetate, hydroxide, borate, nitrate, nitrite, etc.

Similarly, a variety of metal salts can be employed as the source of metallic cations, e.g. the chlorides, carbonates, sulfates, nitrates, etc. The metallic salt and hydrogen ion source should, of course, be compatible with one another in the same fluid exchanging medium.

Preferably, in the exchange the crystalline zeolite is reacted with an alkaline earth salt, such as $MgSO_4$, $MgCl_2$, $CaCl_2$, $SrCl_2$, $BaCl_2$, etc., either alone or in admixture with the aforementioned hydrogen ion sources, to displace soduim with the metals and/or hydrogen or hydrogen-containing ions contained in the salt solution. It is usually not necessary to replace all of the sodium; in some cases, only about three-fourths of the soda need be replaced, provided that less than 0.25 equivalent of sodium per gram of aluminum shall remain.

In addition to the alkaline earth metals, other metals in Groups I-B to VIII can be employed. Representative examples of suitable metals would include the rare earth metals, such as lanthanum, cerium, etc.; Group VI metals, such as chromium, molybdenum and tungsten; Group VII metals, such as manganese; Group VIII metals, such as iron, cobalt, nickel; and other metals including aluminum, zinc, titanium, zirconium, etc.

Subsequent to the exchange treatment, the catalyst is washed and dried. After exchange and calcination at elevated temperature, which calcination may be performed before or after the exchange in order to remove water of hydration, a highly active crystalline alumino-silicate zeolitic catalyst having an ordered crystalline structure results.

The process of the present invention will be more fully understood by reference to the following examples illustrating the same. The cracking reaction is so well known that it need not be redescribed. Thus, catalytic cracking may be carried out in fixed bed, moving bed, a slurry, or fluidized solids bed operating at temperatures of 750° to 1050° F., pressures of near atmospheric to about 100 p.s.i.g. and, in fluid systems, at catalyst to oil ratios of about 1 to 1 to about 20 to 1, all in a manner known per se.

EXAMPLE 1

A solution of 6.87 kg. of 97% NaOH and 1.51 kg. of sodium aluminate in 27 liters of water was added with stirring to 37.6 kg. of low soda Ludox (an aqueous sol of colloidal silica containing 30 wt. percent $SiO_2$ and manufactured by E. I. du Pont de Nemours & Co., Inc.) contained in a 20-gallon porcelain crock. Stirring was continued until the mixture was homogeneous. The mixture was heated to 200° to 205° F. for about 48 hours to effect crystallization. The aqueous layer was decanted and the crystalline material filtered and water washed until the wash water had a pH of 9.3. This sodium form of the catalyst analyzed, after oven drying and calcination to remove water of hydration, 14.0 wt. percent $Na_2O$, 58.6% $SiO_2$, and 23.4% $Al_2O_3$. On a mole basis this corresponds to $$0.98Na_2O:1.00Al_2O_3:4.24SiO_2$$

In the following examples the above zeolite was thereafter base exchanged with the metal cations shown in the illustrative examples below.

Unless otherwise indicated, the final base exchanged zeolite was prepared by contacting for 2 hours at 150° F., 1000 grams of the sodium alumino-silicate with 900 grams of the metal chloride solution in 2 liters of water. After filtration and water washing, the treated zeolite was again contacted with a fresh solution of metal chloride as in the first exchange. A total of 3 exchanges was made. After filtering the final product, it was washed with distilled water until the effluent was free of chloride.

In addition to the exchange of the zeolite with the metal cations, i.e. magnesium, calcium, strontium and zinc cations, one sample of the above zeolite was exchanged with ammonium ion using ammonium chloride solution to produce the "hydrogen" form of the zeolite after calcination at 800° F. for 2 hours; and a second sample was successively exchanged, first with magnesium chloride solution and then with ammonium chloride solution, followed by calcination.

More specifically, the latter "hydrogen-magnesium" form of the zeolite was prepared by contacting a 1-kg. portion of the above sodium form zeolite for 2 hours at 150° F. with a solution of 900 grams of magnesium chloride in 2 liters of water. After filtration and mild water washing, the treated zeolite was again contacted with a fresh solution of magnesium chloride as in the first exchange. A total of 3 exchanges was made in this manner. After filtering the final magnesium-exchanged zeolite, the zeolite was washed with distilled water until the effluent was free of chloride ion. A 500-gram portion (dry basis) of the magnesium-form zeolite was then contacted with a solution of 450 grams of ammonium chloride in 1 liter of water at 80° F. for 2 hours. After filtration the double-exchanged zeolite was washed with distilled water until the effluent was free of chloride ion. The resulting ammonium-magnesium form zeolite analyzed, after oven drying, 2.7% $Na_2O$, 1.06% MgO, 4.82% $NH_3$, 45.8% $SiO_2$ and 20.0% $Al_2O_3$. On a mole basis this corresponds to $$0.22Na_2O:0.72(NH_4)_2O:0.13MgO:1.00Al_2O_3:3.88SiO_2.$$

The sample was calcined at 800° F. for 2 hours prior to its use as a cracking catalyst.

For comparison, a Linde type 13X zeolite having a silica to alumina ratio of 2.5/1 was similarly base exchanged and tested for catalytic activity. Additionally, for purposes of comparison, a standard amorphous silica-alumina catalyst, containing 25% $Al_2O_3$, was steamed at 1050° F. and 0 p.s.i.g. for 16 hours (standard technique) prior to testing. The sieves were measured fresh.

EXAMPLE 2

A cracking test was made comparing magnesium and zinc alumino-silicates having $SiO_2/Al_2O_3$ ratios of about 2.5/1 and of 4.2/1. The magnesium alumino-silicate of high $SiO_2/Al_2O_3$ ratio is outstanding in regard to high conversion (99+%) and low hydrogen make (Table I).

Both the magnesium and zinc alumino-silicates having $SiO_2/Al_2O_3$ ratios of 4.2/1 gave much higher conversions than those having $SiO_2/Al_2O_3$ ratios of 2.5/1.

TABLE I.—CETANE CRACKING TESTS—ZEOLITE CATALYSTS
[900° F., 10 min. cycle, cetane feed]

| Cation | Mg | Zn | Mg | Zn |
|---|---|---|---|---|
| $SiO_2/Al_2O_3$ | 4.2 | 4.2 | 2.5 | 2.5 |
| Conversion, wt. percent | 99.3 | 99.9 | 58.4 | 46.2 |
| $C_3^-$ gas, wt. percent | 19.89 | 27.57 | 8.81 | 7.34 |
| $H_2$, wt. percent | 0.01 | 5.06 | 0.01 | 1.56 |
| $C_4$, wt. percent | 36.85 | 25.28 | 13.70 | 7.43 |
| $C_4H_8$, wt. percent | 1.37 | 2.89 | 8.81 | 4.09 |
| i-$C_4$, wt. percent | 25.72 | 15.40 | 2.89 | 2.32 |
| n-$C_4$, wt. percent | 9.76 | 6.99 | 2.00 | 1.02 |
| $C_5$, wt. percent | 19.41 | 11.94 | 11.60 | 5.93 |
| $C_6$-$C_{10}$, wt. percent | 11.13 | 4.25 | 20.62 | 16.12 |
| $C_5$-$C_{10}$, wt. percent | 30.54 | 16.19 | 32.22 | 22.05 |
| Carbon, wt. percent | 12.00 | 30.92 | 3.75 | 9.33 |
| W./hr./w | 3.14 | 2.14 | 2.27 | 3.97 |

EXAMPLE 3

Further cracking tests were made with these catalysts on East Texas light gas oil and are summarized in Table II. Again the magnesium alumino-silicate of high $$SiO_2/Al_2O_3$$

ratio shows an outstanding high activity of 30+% conversion under the particular test conditions.

TABLE II.—GAS OIL CRACKING TEST—ZEOLITE CATALYSTS
[2-hour cycles, 200 cc. unit—850° F.]

| Cation | Mg | Mg |
|---|---|---|
| $SiO_2/Al_2O_3$ | 4.2 | 2.5 |
| W./hr./w | 3.99 | 3.29 |
| Mat. balance | 99.7 | 99.7 |
| Conversion, wt. percent | 30.2 | 17.7 |
| Product distribution: | | |
| $C_4^-$ gas, wt. percent | 6.4 | 2.2 |
| $C_5$–430° F., wt. percent | 21.2 | 14.7 |
| Carbon, wt. percent | 2.57 | 0.81 |
| 430° F.–650° F | 53.1 | 67.7 |
| $C_5$–430° F.: | | |
| API, gr | 55.5 | 52.0 |
| Percent: | | |
| Aromatics | 29.9 | 26.9 |
| Paraffins | 59.4 | 32.6 |
| Unsaturates | 10.7 | 40.5 |
| 430–650° F.: | | |
| API, gr | 33.6 | 34.5 |
| Bromine number | 9.3 | 6.9 |

EXAMPLE 4

A series of tests was made in a 200 cc. laboratory unit (fixed bed) comparing, under comparable conditions, the catalytic activity for cracking East Texas light gas oil of a number of zeolite catalysts. For comparison, a 25% alumina-containing catalyst made by Davison Chemical Company and considered an outstanding commercial cracking catalyst, was likewise tested under the same conditions.

The data in Table III shows that, except for the low ratio strontium and zinc sieves, all those tested showed an activity at least as good as the commercial catalyst. However, the high $SiO_2/Al_2O_3$ ratio zeolites were uniformly superior to the low ratio zeolites, and the magnesium high ratio zeolite is an exceptionally active catalyst. Furthermore, it forms high yields of gasoline product without concomitant formation of excessive amounts of carbon and light gases, exhibited by some of the other catalysts tested.

TABLE III
[200 cc. fixed bed unit, 950° F.; East Texas light gas oil feed; ½-hour cycle]

| | Silica/alumina [1] | Cationic exchanged alumino-silicate | | | | | | | | | |
|---|---|---|---|---|---|---|---|---|---|---|---|
| | | Cation | | | | | | | | | |
| | | Mg | Mg | Ca | Ca | Sr | Sr | Zn | Zn | H[2] | Mg-H[3] |
| Catalyst: | | | | | | | | | | | |
| $SiO_2/Al_2O_3$, mole ratio | 5.1 | 4.2 | 2.5 | 4.2 | 2.5 | 4.2 | 2.5 | 4.2 | 2.5 | 4.2 | 4.2 |
| Relative activity [4] | 1.0 | 4.0 | 1.0 | 2.7 | 2.3 | 1.9 | 0.6 | 1.0 | 0.6 | 1.5 | 1.8 |
| Correlated yields at 50 wt. percent conversion: | | | | | | | | | | | |
| Carbon, wt. percent | 2.9 | 3.1 | 4.5 | 4.0 | 4.3 | 6.0 | 9.0 | 28.0 | 21.0 | 11.5 | 10.5 |
| $C_4$-gas, wt. percent | 18.0 | 12.0 | 11.7 | 12.2 | 10.6 | 13.0 | 11.0 | 13.7 | 16.1 | 21.5 | 22.0 |
| $C_5$-430° F., wt. percent | 29.1 | 34.9 | 33.8 | 35.1 | 31.0 | 30.0 | 8.3 | 12.9 | 17.9 | 17.5 | |
| RON plus 3 cc. TEL | 100 | 99 | 99 | 99 | | 99 | | | | | |
| MON plus 3 cc. TEL | 89 | | 89 | | | | | | | | |

[1] Davison Co.
[2] Hydrogen sieve.
[3] Magnesium-hydrogen sieve.
[4] Ratio of reciprocal w./hr./w. at 50% conversion.

Thus, the high $SiO_2/Al_2O_3$ ratio large pore alkaline earth zeolites (Mg, Ca, Sr, H, H-Mg) show higher activity than is obtained with the standard silica-alumina catalyst. Of these, the magnesium is outstanding in showing, at the relatively long cracking period of ½ hour, a fourfold advantage in activity over the standard silica-alumina catalyst. Though carbon production is slightly higher, carbon plus gas made is substantially lower so that the $C_5$-430° F. gasoline yield is 5.1 to 5.8% greater than with the standard catalyst.

EXAMPLE 5

A further series of tests was made, as in Example 4, to show the effects of short cycle lengths in fixed bed operation. These tests were made with a Mg-Y zeolite having an $SiO_2/Al_2O_3$ ratio of 4.2.

Cracking Of East Texas Light Gas Oil With Mg-Y Zeolite Catalyst
Unit: 200 cc. fixed bed; feed: lt. gas oil; temp.: 950° F.

| Cracking cycle, minutes | 30 | | 20 | | 10 | |
|---|---|---|---|---|---|---|
| W./hr./w. | 84 | (2.1) | 7.7 | | 7.1 | |
| Conversion, wt. percent | 55.5 | | 67.5 | | 83.8 | |
| Product dist., wt. percent: | | | | | | |
| $C_4$-gas | 14.5 | (21.0) | 20.0 | (30.6) | 29.8 | (51.0) |
| $C_5$-430° F. | 36.3 | (30.6) | 39.9 | (29.5) | 39.9 | (15.0) |
| Carbon | 4.7 | (3.9) | 7.6 | (7.1) | 14.1 | (17.8) |

The numbers in parentheses are the correlated values for steamed Davison commercial 25% alumina catalyst at the same conversion level, all based on 30-minute cycles. As the cracking cycle length was decreased, conversion with the Mg-Y catalyst increased to 83.8% for a 10-minute processing period. Gasoline yield increased to 39.9% for the 10 and 20-minute cycles. This is a remarkable performance for the zeolite catalyst in view of the rapid decrease in gasoline yields indicated for the commercial silica-alumina catalyst at corresponding conversion levels. Further advantage can be taken of the high activity and selectivity characteristics of the zeolite catalyst by operating with short cycles and at lower temperatures, or preferably, at even higher feed rates to gain a more favorable product distribution at lower conversion levels.

EXAMPLE 6

A synthetic sodium alumino-silicate of about 5.2

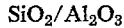

mole ratio was prepared with the following proportions of reagents. A solution of 300 grams of NaOH and 85 grams of sodium aluminate in 1075 cc. of water was added with stirring to 1930 grams of low soda Ludox (30% $SiO_2$) contained in a 2-gallon porcelain crock. Stirring was continued until the mixture was homogeneous. The mixture was heated in a flask under reflux to 210–215° F. for 5½ days to effect crystallization. The aqueous layer was decanted and the crystalline material filtered and water washed until the wash water had a pH of 9.5. This sodium form of the catalyst analyzed, after oven drying, 13.5 wt. percent $Na_2O$, 63.6% $SiO_2$, and 20.75% $Al_2O_3$. On a mole basis, this corresponds to: 1.07 $Na_2O$:1.00 $Al_2O_3$:5.19 $SiO_2$.

Various proportions of the sodium ions in the above sodium alumino-silicate were replaced with magnesium by cationic exchange. This was accomplished by contacting 1000 grams of the dried (250–300° F.) powder with 1100 grams of $MgSO_4 \cdot 7H_2O$ in 2 liters of water at 80° F. for 30 minutes. After filtration and the removal of a portion of the alumino-silicate for analysis, the remainder was contacted with fresh $MgSO_4$ solution as in the first exchange. A total of 5 exchanges was made. Each sample from the first four exchanges and the final product was water washed until the wash water was free of sulfate ion. The following composition data were obtained.

| | Percent | |
|---|---|---|
| | $Na_2O$ | MgO |
| Exchange number: | | |
| 0 | 13.5 | 0 |
| 1 | 7.3 | |
| 2 | 6.1 | |
| 3 | 5.0 | 5.5 |
| 4 | 5.0 | 5.8 |
| 5 | 4.8 | 5.8 |

The product from the fifth exchange was employed in stability and hydrocarbon cracking performance tests described in Examples 7 and 8, although little change in composition was effected after the third exchange.

EXAMPLE 7

Stability tests were conducted with magnesium exchanged zeolites of varying silica-alumina ratios. The following data show the beneficial effects of increasing the silica-alumina ratio with respect to the stability of the zeolite.

Effect of $SiO_2/Al_2O_3$ Ratio on Steam and Thermal Stability

| | Structural maintenance, percent of original crystallinity | | |
|---|---|---|---|
| $SiO_2/Al_2O_3$, ratio | 2.7 | 4.2 | 5.2 |
| Heated in ambient air: | | | |
| 16 hrs. at 1,400° F | 0 | 100 | 100 |
| 2 hrs. at 1,500° F | 0 | 90 | 100 |
| 16 hrs. at 1,500° F | 0 | 0 | 75 |
| Heated in 1 atm. steam: | | | |
| 1 hr. at 950° F | 57 | 100 | 100 |
| 24 hrs. at 950° F | 24 | 100 | 100 |
| 16 hrs. at 1,200° F | 0 | 43 | 73 |

EXAMPLE 8

A comparison of cracking performance of magnesium exchanged zeolites of 4.2 and 5.2 silica/alumina mole ratio was made in a manner similar to that in Examples 4 and 5. However, in order to make a more valid comparison of these highly active catalysts at a short cycle time of 10 minutes, the catalysts were mixed with an inert diluent (1 part of catalyst, 9 parts of inert silica) in order to limit the conversion to about 50–60%. In the following tabulation the feed rate is expressed as weight of feed per hour per weight of magnesium zeolite (ex diluent). The catalysts were calcined at 650° F. They were then tested as prepared and also after steaming at 1050° F. for 16 hours in 1 atmosphere of steam.

| Catalyst: SiO$_2$/Al$_2$O$_3$, mole ratio | 4.2 | | 5.2 | |
|---|---|---|---|---|
| Analyses, percent: | | | | |
| MgO | 5.5 | | 4.9 | |
| Na$_2$O | 5.8 | | 5.8 | |
| Catalyst pretreatment | Heated at 650° F. | Steamed at 1,050° F. | Heated at 650° F. | Steamed at 1,050° F. |
| Cracking test: | | | | |
| Run length, min | 10 | 10 | 10 | 10 |
| W./hr./w. (on sieve cat.) | 27 | 27 | 27 | 27 |
| Temperature, ° F | 930 | 930 | 930 | 930 |
| Conversion, wt. percent | 53.8 | 50.8 | 57.2 | 59.3 |
| Carbon, wt percent | 3.0 | 2.1 | 4.3 | 3.1 |
| C$_4$-gas, wt. percent | 14.9 | 12.5 | 15.2 | 13.9 |
| C$_5$-430° F., wt. percent | 35.9 | 36.2 | 37.2 | 42.3 |

The above data show the high activity of these catalysts even after steaming. The steam treatment was beneficial in giving lowered carbon and gas selectivities. Under the above conditions of steaming, the 5.2 silica/alumina ratio catalyst shows a better retention of activity in keeping with the structural retention data shown in Example 7.

Additionally, the data illustrate that zeolites having a silica to alumina mole ratio of 5 to 6 are better catalytic cracking catalysts than zeolites having a lower mole ratio.

Various modifications may be made to the present invention. As mentioned, in one modification the present catalyst may be prepared from a sodium alumino-silicate in which at least a part of the sodium was replaced by hydrogen prior to cationic exchange with alkaline earth metal ions.

Having described the present invention, that which is sought to be protected is set forth in the following claims.

What is claimed is:

1. In the catalytic cracking of a hydrocarbon oil to produce hydrocarbons of lower boiling range, the improvement of contacting said oil under cracking conditions with a crystalline aluminosilicate having pore openings between about 6 to 15 Angstrom units and an ordered crystalline structure having from 0.5 to 1.0 equivalent per gram atom of aluminum of ions of positive valence of which no more than 0.25 equivalent are alkali metal cations and having associated with said crystalline aluminosilicate both hydrogen ions or ions capable of conversion to hydrogen ions and cations of metals selected from Group IB through Group VIII of the Periodic Table, said metal cations, hydrogen ions and ions capable of conversion to hydrogen ions being associated with the aluminosilicate as a result of base exchange.

2. The process of claim 1 wherein the hydrogen ions and ions capable of conversion to hydrogen ions are associated with the crystalline aluminosilicate in amounts ranging from 0.01 to 0.99 equivalent per gram atom of aluminum and the cations of metals selected from Group IB through Group VIII of the Periodic Table are associated with the aluminosilicate in amounts ranging from 0.99 to 0.01 equivalent per gram atom of aluminum.

3. The process of claim 2 wherein the metal cation is an alkaline earth metal cation.

4. In the catalytic cracking of a hydrocarbon oil to produce hydrocarbons of lower boiling range the improvement of contacting said oil under cracking conditions with a crystalline aluminosilicate having pore openings between about 6 to 15 Angstrom units and an ordered crystalline structure having from 0.5 to 1.0 equivalent per gram atom of aluminum of ions of positive valence of which no more than 0.25 equivalent are alkali metal cations and having associated with said crystalline aluminosilicate both ammonium ions and cations of metals selected from Group IB through Group VIII of the Periodic Table, said metal cations and ammonium ions being associated with the aluminosilicate as a result of base exchange.

5. The process of claim 4 wherein the ammonium ion is associated with the crystalline aluminosilicate in an amount ranging from 0.99 to 0.01 equivalent per gram atom of aluminum and the cations of metals selected from Group IB through Group VIII of the Periodic Table are associated with the crystalline aluminosilicate in amounts ranging from 0.01 to 0.99 equivalent per gram atom of aluminum.

6. The process of claim 5 wherein the metal cation is an alkaline earth metal cation.

7. In the catalytic cracking of a hydrocarbon oil to produce hydrocarbons of a lower boiling range the improvement of contacting said oil under cracking conditions with a faujasite having pore openings between about 6 to 15 Angstrom units and from 0.5 to 1.0 equivalents per gram atom of aluminum of ions of positive valence of which no more than 0.25 equivalent are alkali metal cations and having associated with said faujasite both hydrogen ions or ions capable of conversion to hydrogen ions and cations of metals selected from Group IB through Group VIII of the Periodic Table, said metal cations, hydrogen ions and ions capable of conversion to hydrogen ions being associated with the aluminosilicate as a result of base exchange.

8. In the catalytic cracking of a hydrocarbon oil to produce hydrocarbons of lower boiling range, the improvement of contacting said oil under cracking conditions with a crystalline aluminosilicate having pore openings between about 6 to 15 Angstrom units and an ordered crystalline structure having from 0.8 to 1.0 equivalent per gram atom of aluminum of ions of positive valence of which no more than 0.25 equivalent are alkali metal cations and having associated with said crystalline aluminosilicate both hydrogen ions or ions capable of conversion to hydrogen ions and cations of metals selected from Group IB through Group VIII of the Periodic Table, said metal cations, hydrogen ions and ions capable of conversion to hydrogen ions being associated with the aluminosilicate as a result of base exchange.

9. In the catalytic cracking of petroleum oil fractions, the improvement which comprises contacting said fractions under catalytic cracking conditions with a crystalline aluminosilicate zeolite which has pore openings between about 6 to 15 Angstrom units and contains hydrogen ions or ions capable of conversion to hydrogen ions, and metal cations other than alkali metal cations, said hydrogen ions and metal cations being associated with the aluminosilicate as a result of base exchange.

10. The improvement of claim 9 wherein said metal cations are alkaline earth metal cations.

11. The improvement of claim 9 wherein said zeolite has a silica-to-alumina mol ratio greater than 3.

12. The improvement of claim 9 wherein said zeolite has a silica-to-alumina mol ratio greater than 4 to 6.

13. The improvement of claim 11 wherein said metal cation is magnesium.

14. The improvement of claim 11 wherein said metal cation is zinc.

15. The improvement of claim 11 wherein said metal cation is strontium.

16. The improvement of claim 11 wherein said metal cation is calcium.

17. In a process for the catalytic cracking of petroleum oil fractions, the improvement which comprises contacting said oil fractions under cracking conditions with a crystalline aluminosilicate zeolite having uniform pore openings between about 6 and 15 Angstrom units and a silica-to-alumina mol ratio between 3 and 6, said aluminosilicate being characterized by containing both hydrogen ions or ions capable of conversion to hydrogen ions and alkaline earth metal cations, said alkaline earth matal cations and hydrogen cations being associated with said zeolite as a result of base exchange.

18. In a process for the catalytic cracking of petroleum oil fractions, the improvement which comprises contacting said oil fractions under cracking conditions with a crystalline aluminosilicate zeolite having uniform pore openings between about 6 and 15 Angstrom units and a silica-to-alumina mol ratio between 3 and 6, said aluminosilicate being characterized by containing both hydrogen ions or ions capable of conversion to hydrogen ions and cations of metals selected from the group consisting of alkaline earth metals and zinc, said metal cations and hydrogen ions being associated with said zeolite as a result of base exchange.

References Cited

UNITED STATES PATENTS

| | | | |
|---|---|---|---|
| 2,971,904 | 4/1961 | Gladrow et al. | 208—135 |
| 3,140,249 | 7/1964 | Plank et al. | 208—120 |
| 3,140,251 | 7/1964 | Plank et al. | 208—120 |
| 3,140,322 | 7/1964 | Frilette et al. | 260—667 |
| 3,140,252 | 7/1964 | Frilette et al. | 208—120 |

DELBERT E. GANTZ, Primary Examiner

G. E. SCHMITKONS, Assistant Examiner

U.S. Cl. X.R.

208—Dig. 2; 252—455 Z